United States Patent [19]

Moffett

[11] Patent Number: 5,928,474
[45] Date of Patent: Jul. 27, 1999

[54] MODIFIED STARCH COMPOSITION FOR REMOVING PARTICLES FROM AQUEOUS DISPERSIONS

[75] Inventor: Robert Harvey Moffett, Landenberg, Pa.

[73] Assignee: E. I. du Pont de Nemours and Company, Wilmington, Del.

[21] Appl. No.: 09/176,502

[22] Filed: Oct. 21, 1998

Related U.S. Application Data

[60] Continuation-in-part of application No. 09/151,344, Sep. 11, 1998, which is a division of application No. 08/960,648, Oct. 30, 1997, Pat. No. 5,859,128.

[51] Int. Cl.$^6$ .................................................. D21H 21/10
[52] U.S. Cl. ........................................ 162/168.3; 162/175
[58] Field of Search ............................... 162/168.1, 168.3, 162/175, 183

[56] References Cited

U.S. PATENT DOCUMENTS

| | | | |
|---|---|---|---|
| 4,066,495 | 1/1978 | Voigt et al. | 162/168 NA |
| 4,388,150 | 6/1983 | Sunden et al. | 162/175 |
| 4,643,801 | 2/1987 | Johnson | 162/164.1 |
| 4,954,220 | 9/1990 | Rushmere | 162/168.3 |
| 5,176,891 | 1/1993 | Rushmere | 423/328.1 |
| 5,178,730 | 1/1993 | Bixler et al. | 162/168.3 |
| 5,482,595 | 1/1996 | Harington, IV et al. | 162/168.3 |
| 5,482,693 | 1/1996 | Rushmere et al. | 423/328.1 |

FOREIGN PATENT DOCUMENTS

| | | |
|---|---|---|
| 2-14096 | 1/1990 | Japan . |
| WO 91/07543 | 5/1991 | WIPO . |

*Primary Examiner*—Peter Chin

[57] ABSTRACT

Modified starches prepared by cooking an amphoteric or cationic starch and an anionic, amphoteric, or cationic polyacrylamide have utility as a retention aid in the manufacture of paper.

6 Claims, No Drawings

MODIFIED STARCH COMPOSITION FOR REMOVING PARTICLES FROM AQUEOUS DISPERSIONS

CROSS-REFERENCE TO RELATED APPLICATION

This application is a continuation-in-part of application Ser. No. 09/151,344, filed Sep. 11, 1998, which is a divisional of application Ser. No. 08/960,648, filed Oct. 30, 1997, now U.S.Pat. No. 5,859,128.

BACKGROUND OF THE INVENTION

1. Field of the Invention

This invention relates to compositions obtained by cooking a cationic or amphoteric starch and a cationic, nonionic, or amphoteric polyacrylamide. The resulting modified starch compositions have general utility as a clarifying aid for removing solids from an aqueous dispersion, and have special utility as a retention aid in the manufacture of paper.

2. Background of the Prior Art

Paper production involves the formation and dewatering of a web primarily composed of cellulose fibers and inorganic filler. The web is formed by spreading an aqueous suspension containing the cellulose fibers and inorganic filler over a wire or net, and then removing water to form a fiber web or sheet. The aqueous suspension is referred to as "paper furnish" in the trade, and the removed water is referred to as "white water."

The industry long has sought ways to reduce the percentage of small cellulose fibers and filler particles that are removed with the white water as the paper web is formed. Not only does this represent a loss of material, but it also contributes to a build-up of material in the white water known as "anionic trash" that impairs efficient operation of the equipment. Thus, improved retention of the smaller particles not only makes water removal easier, but also improve yield and productivity of the paper-making process.

Many additives have been suggested in the prior art for improving fines retention and wet-end drainage. Cationic starches frequently are used for this purpose, particularly the relatively expensive cationic potato and waxy maize starches. Less expensive cationic corn starch has been used, but it generally does not provide adequate fines retention and wet-end drainage.

Many suggestions are made in the prior art concerning improvements to the efficiency of cationic starch for this purpose. PCT application WO 91/07543 published May 30, 1991, for example, proposes that a cationic starch, a cationic polyacrylamide, and a polymeric silicic acid may be added to the cellulose suspension to improve fines retention and dewatering. The addition of large quantities of polyacrylamide, however, not only adds substantial costs to the paper-making process, but also may overflocculate the paper furnish, resulting in poor paper formation.

Thus, there is an ongoing need for additives to improve fines retention and wet-end drainage in the manufacture of paper.

SUMMARY OF THE INVENTION

It now has been found that amphoteric and cationic starches exhibit improved performance as a retention additive in the manufacture of paper if the starches are cooked with a cationic, nonionic, or amphoteric polyacrylamide. Accordingly, the invention provides a modified starch prepared by cooking an amphoteric starch or cationic starch having a degree of substitution between about 0.01 to 0.2 with at least one polyacrylamide having a molecular weight of at least 500,000 selected from the group consisting of a nonionic polyacrylamide, an amphoteric polyacrylamide, and a cationic polyacrylamide having a degree of substitution between 1% and 80% by weight, said cooking being at an elevated temperature below 80° C. in an aqueous solution having a pH above about 7.0, wherein the weight ratio of starch to polyacrylamide is greater than about 5 to 1, for a time effective to modify said starch. While the modified starch has particular utility in the manufacture of paper, it also has general utility for removing solids from aqueous suspensions.

DETAILED DESCRIPTION OF THE PREFERRED EMBODIMENTS

The modified starches provided by this invention improve fines retention and wet-end drainage in the paper-making process, while allowing the selection of less expensive or reduced amounts of certain additives. More specifically, it has been found that cationic or amphoteric starches, when cooked with a cationic, nonionic, or amphoteric polyacrylamide, improve fines retention over that achieved by separately adding the starch and polyacrylamide during the paper-making process.

STARCH

The cationic starch may be any of those previously used in papermaking. The cationic starch may be derived from any of the common starch producing materials such as corn starch, potato starch, waxy maize starch and wheat starch. Cationization is achieved by any of the commercially known procedures, such as the addition of 3-chloro-2-hydroxypropyltrimethylammonium chloride to obtain cationic starches with various degrees of nitrogen substitution. The degree of cationic substitution on the starches (wt. % nitrogen/starch) can range from about 0.01 to about 0.2, preferably between 0.02 and 0.15. Naturally occurring amphoteric starches, such as potato starch, or synthetic amphoteric starches, also may be selected.

POLYACRYLAMIDE (PAM)

The PAM is nonionic, amphoteric, or preferably cationic, having a molecular weight of at least 500,000, preferably at least 1,000,000.

The cationic and amphoteric PAM may have a degree of cationic substitution by weight from 1% to about 80%, preferably from 10% to about 40%. By "degree of substitution" it is meant that the polymers contain randomly repeating monomer units containing chemical functionality which, when dissolved in water, become cationically charged. These monomer units include, but are not limited to, groups such as amine groups. The PAM may be a solid, powder form, micro-bead form, a water-in-oil emulsion or any other commercially known form. Suitable PAM can be obtained from Allied Colloids, Suffolk, Va., and from Nalco, Naperville, Ill., as well as other sources.

COOKING

The starch and PAM may be dry blended together or blended as a slurry or slurries in water before being cooked, or they may be blended during the starch cooking process. Rather than blending dry or slurried PAM, the PAM may instead be prehydrated before being blended and cooked with the starch. Rather than blending dry or slurried starch, the starch may instead be cooked, blended with the PAM, and then recooked.

Cooking conveniently is accomplished using a starch cooker at the paper mill. A batch cooker or continuous cooker, such as a jet cooker, may be selected. Continuous jet cooking typically is conducted at temperatures from about 80 to 130° C. at 1 atmosphere or higher pressure. The solids content during cooking generally is less than 15%, but higher solids concentrations may be used if adequate mixing can be accomplished.

Selected cooking times and temperatures will vary with the composition and equipment. Cooking conditions must be sufficient to gelatinize the starch and for the PAM to at least partially hydrate and react with the starch. Elevated temperatures above 65° C., preferably 80° C. to 100° C., typically will be selected for this purpose although temperatures below 65° C. may be selected for some compositions and cooking equipment. For example, advantages of the invention have been observed at cooking temperatures as low as 60° C. Temperatures above 100° C. may be selected if decomposition of the starch and PAM is prevented. Thus, batch cooking can be selected in practicing the invention, at pressures greater than one atmosphere, to employ a cooking temperature higher than 100° C. and as high as 130° C., or higher. The selected cooking time typically will be in the range of a few minutes to less than an hour. Longer cooking times generally are required for lower cooking temperatures.

When using cationic or nonionic PAM, best results are obtained if the starch/PAM mixture is cooked at a pH above 7, although some improvement in ash retention is also found at a pH below 7. The preferred cooking pH for either cationic or nonionic PAM and starch is from about 8 to about 10.5. pH is not critical when an amphoteric PAM is selected, but typically will be in the range of 3 to 11.

Cooking pH may be adjusted with conventional acids, bases, or salts. Use of alkaline aluminum compounds, such a sodium and potassium aluminate, have been found to be particularly useful for this purpose as these compounds also boost retention performance, as illustrated in Example 6. Surprisingly, retention performance is thereby improved even in acid paper furnishes. Further, it has been found that inclusion of the alkaline aluminum compound in the cooking solution results in a modified starch that permits us of a non-aluminized microparticulate retention aid in acidic paper furnishes, to further improve retention performance, whereas these non-aluminized retention aids typically do not perform well in acidic paper furnishes.

The weight ratio of PAM to starch will vary with the selected ingredients, and the extent to which improvements are desired in fines retention and wet end drainage. For example, it has been found that poor-performing corn starch may be improved to the extent that it is equal or superior to the more expensive potato starch by cooking the corn starch with as little as 1% PAM, by weight. Typically, the selected weight ratio of starch to PAM will be greater than 5 to 1, preferably greater than 10 to 1. The amount of PAM added to the starch should be limited below that which would cause the starch to precipitate, which will vary with the ingredients and cooking process that is selected.

PAPER MAKING

The cooked starch/PAM composition may be added to any suitable paper furnish as a retention aid to improve fines retention and wet end drainage. The paper furnish may contain a variety of wood pulp and inorganic fillers, and typically has a pH of about 4 to 10. Thus bleached kraft pulp, thermomechanical, chemical-thermomechanical and groundwood pulps may be used together with clays, precipitated or ground calcium carbonate, titanium dioxide and other inorganic fillers if desired. Such fillers typically are used at the 15% to 20% loading level, as a weight percent of the total paper weight, but may reach levels as high as 30%, or higher, for some specialty applications.

Particularly advantageous results are obtained when the paper furnish also contains an anionic inorganic colloid, as is conventional in the paper-making industry. Thus the furnish may contain, for example, montmorillonite, bentonite, silica sols, aluminum modified silica sols, aluminum silicate sols, polysilicic acid, polysilicate microgels and polyaluminosilicate microgels, separately or in combination.

The paper furnish also may contain other typical additives, such as size, aluminum compounds (alum, aluminates, polyaluminum chlorides, etc.), cationic polymers (retention aids and flocculents), anionic polymers, and/or separate additions of starch. Aluminum compounds in particular have been found to boost retention performance of the cooked starch/PAM compositions. While the above ingredients may be added in any order with good results, the preferred order of addition is to add the alumina compound first, the cooked/PAM of this invention next, and then an inorganic anionic colloid.

While the invention has been described in detail as applied to paper-making, it will be appreciated that the compositions also have utility as clarifying aids to remove solids from aqueous suspensions.

The invention now will be exemplified, but not limited, by the following Examples.

For consistency, in all examples the performance of the test solutions was measured as retention aids in a 5 gram/liter paper furnish composed of 35% bleached kraft hardwood, 35% bleached kraft softwood, and 30% precipitated calcium carbonate (PCC). The furnish pH was 8.0. The furnish was mixed in Britt Jar equipped with a 50 R screen (100 mesh) at 750 RPM. Ash retention's were determined from the white water sample by following Tappi Standard T-261.

EXAMPLE 1

This example demonstrates how cooking cationic starch and cationic PAM together yields better retention than adding the same two chemicals separately but simultaneously to the paper furnish. A dry blend was prepared by mixing 3.0 grams of Stalok 300 cationic corn starch from Staley Starch with 0.04 grams of cationic PAM "A" having a molecular weight of about 4,000,000 and a degree of substitution of 22 wt. %. This blend was added to 497 grams of deionized water and the pH adjusted to 8.5 using sodium hydroxide. The solution was heated on a hot plate stirrer for 30 minutes and began to boil at about 15 minutes into the cooking cycle. After cooking the solution was removed from the hot plate and allowed to cool. The solution was reweighed and any water which evaporated was replaced.

A second dry blend was prepared by mixing 3.0 grams of BMB-40 cationic potato starch from Akzo Nobel with 0.04 grams of PAM "A". To this blend was added 497 grams deionized water and the pH was adjusted to 8.5 and cooked following the method described above.

As comparisons, samples of Stalok 300 corn starch and BMB-40 potato starch were prepared as 0.5 wt % solutions following the cooking procedure above. The pH of these starch solutions was not adjusted. A 0.125 wt. % sample of PAM "A" was separately prepared by adding 1 gram of PAM "A" to 799 grams of deionized water and mixing the resulting solution for 1 hour.

Starch and PAM were separately added to the furnish at a dose rate of 15 lb/ton (7.5 kg/tonne) and 0.25 lb/ton (0.125 kg/tonne) respectively. In this and following examples, polyaluminosilicate microgel solution (PAS) prepared following U.S. Pat. No. 5,482,693 was added to the furnish in some tests. The order of chemical addition was:

| Time (sec) | Step |
|---|---|
| 00 | Start mixer |
| 15 | Add starch; add PAM |
| 30 | Add PAS |
| 45 | Open Britt Jar drain valve |
| 50 | Begin collecting white water |
| 80 | Stop collection white water |

The ash retention results are shown in Table 1.

TABLE 1

% Ash Retention vs. Addition Procedure and PAS Dose

| PAS Dose (Kg SiO$_2$/ Tonne) | Separate Add'n Corn Starch + PAM | Cooked both Corn Starch + PAM | Separate Add'n Potato Starch + PAM | Cooked both Potato Starch + PAM |
|---|---|---|---|---|
| 0 | 17% | 27% | 21% | 25% |
| 0.5 | 27% | 39% | 40% | 47% |
| 1.0 | 28% | 44% | 47% | 56% |

The results clearly show that ash retention is markedly improved by cooking cationic starch and cationic PAM together at pH 8.5 before adding these chemicals to the upper furnish, and that the ash retention increases with higher doses of PAS. Especially significant from a cost-of-ingredient standpoint, the performance of corn starch and PAM when cooked together was essentially equivalent to that of the much more expensive potato starch/PAM combination prior art.

EXAMPLE 2

This example demonstrates the need to cook the cationic starch and cationic PAM together than simply mixing them at lower temperatures.

Sample A was prepared by mixing 3.0 grams of Stalok 300 with 497 grams of deionized water and adjusting the pH to 8.5. The solution was cooked using the cooking procedure described in Example 1. After the sample had cooled to 35° C., 0.04 grams of PAM "A" was added and the resulting solution was mixed for 1 hour before testing.

Sample B was prepared by mixing 3.0 grams of Stalok 300 with 497 grams of deionized water and adjusting the pH to 8.5. The solution was cooked using the cooking procedure described in Example 1. After the sample had cooled to 95° C., 0.04 grams of PAM "A" was added and the resulting solution was mixed for 1 hour before testing.

Sample C was prepared by blending 3.0 grams of Stalok 300 with 0.04 grams of PAM "A", then adding 497 grams of deionized water and adjusting the pH to 8.5. The solution was cooked using the cooking procedure described in Example 1.

Table 2 below shows the ash retention results. In this table, the pH of the starch solution or starch/PAM solution before cooking is labeled as "a:pH". The pH after cooking was also measured, and is labeled as "b:pH".

TABLE 2

% Ash Retention vs. Cooking/Mixing Procedure and PAS Dose

| | Stalok 300 and PAM "A" | | |
|---|---|---|---|
| PAS Dose (Kg SiO$_2$) Tonne) | Sample A a: pH = 8.5 b: pH = 7.0 | Sample B a: pH = 8.5 b: pH = 8.1 | Sample C a: pH = 8.5 b: pH = 9.2 |
| 0 | 25% | 29% | 36% |
| 0.5 | 39% | 44% | 55% |

The results also show that cooking the cationic starch alone at pH above 8.5 and then mixing with PAM at 35° C. (mixed Sample A) or 95° C. (mixed Sample B) is much less beneficial for improving ash retention than cooking them together in accordance with the inventive process (cooked Sample C.)

EXAMPLE 3

This example demonstrates that the pH when cooking cationic starch and cationic PAM together has a significant effect on the improved retention. First, 3.0 gram samples of Stalok 300 corn starch were dry blended with 0.04 grams of various types of cationic PAM and then dispersed in 497 grams of deionized water. Cationic PAM "B" has a molecular weight of about 7,000,000 and a degree of substitution of 22 wt. %. Cationic (liquid) PAM "C" has a molecular weight of about 4,000,000 and a degree of substitution of 22 wt. %. Since PAM "C" has an active ingredient content of 50%, 0.08 grams was added in this case. The pH of the starch/ PAM solutions were then adjusted to the values shown in Table 3 (labeled as "a:pH"). and cooked following the cooking procedure described in Example 1. NA means the pH was not adjusted. The pH after cooking was also measured, and is labeled as "b:pH".

The performance of the above solutions was tested as retention aids as before. Starch and PAM were added to the furnish at a dose rate of 15 lb/ton (7.5 kg/tonne) and 0.25 lb/ton (0.125 kg/tonne) respectively. PAS prepared as in Example 1 was added to the furnish in some tests. Order of addition of the chemicals was the same as Example 1. The results are shown in Table 3.

TABLE 3

% Ash Retention vs. pH Adjustment and PAS Dose

| A. Stalok 300 and PAM "A" | | | | |
|---|---|---|---|---|
| PAS Dose (Kg SiO$_2$/Tonne) | a: pH = NA b: pH = 4.9 | a: pH = 7.0 b: pH = 6.4 | a: pH = 8.5 b: pH = 8.0 | a: pH = 10.0 b: pH = 9.7 |
| 0 | 22% | 25% | 30% | 29% |
| 0.5 | 30% | 37% | 44% | 47% |
| 1.0 | 31% | 40% | 43% | 48% |

| B. Stalok 300 and PAM "B" | | | | |
|---|---|---|---|---|
| PAS Dose (Kg SiO$_2$/Tonne) | a: pH = NA b: pH = 5.1 | a: pH = 7.0 b: pH = 6.9 | a: pH = 8.5 b: pH = 8.9 | a: pH = 10.0 b: pH = 10.1 |
| 0 | 20% | 28% | 32% | 30% |
| 0.5 | 29% | 46% | 42% | 51% |

TABLE 3-continued

% Ash Retention vs. pH Adjustment and PAS Dose

C. Stalok 300 and PAM "C"

| PAS Dose (Kg SiO$_2$/Tonne) | a: pH = NA<br>b: pH = 5.4 | a: pH = 7.5<br>b: pH = 7.0 | a: pH = 8.5<br>b: pH = 9.0 | a: pH = 10.0<br>b: pH = 10.0 |
| --- | --- | --- | --- | --- |
| 0 | 22% | 25% | 27% | 30% |
| 0.5 | 29% | 45% | 46% | 44% |
| 1.0 | 33% | 44% | 48% | 43% |

The results clearly show how retention is improved by cooking cationic starch and cationic PAM together at pH above 5.5.

EXAMPLE 4

This example demonstrates that cationic starch blended and cooked with prehydrated cationic PAM at pH 8.5 also improves retention. A sample of 0.125% cationic PAM was prepared by adding 1.0 grams of PAM "B" to 799 grams of deionized water. The solution was allowed to hydrate for 1 hour. Then 33.3 grams of this 0.125% PAM solution was mixed with 464 grams of deionized water and 3.0 grams of Stalok 300. The pH was then adjusted to 8.5 and the solution was cooked following the cooking procedure described in Example 1. A second starch/PAM blend was prepared by dry blending 0.04 grams of PAM "B" with 3 grams of Stalok 300 and then adding the dry blend to 497 grams of deionized water. The pH was adjusted to 8.5 and cooked following the procedure described in Example 1.

The performance of the above solutions was tested as a retention aid as before. Starch and PAM were added to the furnish at a dose rate of 15 lb/ton (7.5 kg/tonne) and 0.25 lb/ton (0.125 kg/tonne), respectively. PAS prepared as in Example 1 was added to the furnish in some tests. Order of addition of the chemicals was the same as in Example 1. A test was also conducted where the Stalok 300 cationic corn starch and prehydrated PAM "B" were added separately but simultaneously to the paper furnish.

TABLE 4

% Ash Retention vs. PAM Hydration and PAS Dose

| PAS Dose (Kg SiO$_2$/Tonne) | Separate Add'n Corn Starch + Prehydr. PAM | Cooked both Corn Starch + Dry PAM | Cooked both Potato Starch + Prehydr. PAM |
| --- | --- | --- | --- |
| 0 | 23% | 36% | 37% |
| 0.5 | 37% | 51% | 51% |
| 1.0 | 44% | 53% | 50% |

The results shown in Table 4 clearly indicate that cooking cationic starch with prehydrated cationic PAM at pH 8.5 provides the same level of ash retention as cooking the dry blended starch and PAM. Both methods provide superior results to adding the same chemicals separately to the paper furnish.

EXAMPLE 5

This example demonstrates that the addition of an aluminum compound to the papermaking furnish boosts the performance of the cationic starch/cationic PAM blend. A dry blend was prepared by mixing 3.0 grams of Stalok 300 cationic corn starch from Staley Starch with 0.04 grams of cationic PAM "A". To this blend was added 497 grams of deionized water. The pH was adjusted to 8.6. The solution was heated on a hot plate stirrer for 30 minutes and began to boil about 15 minutes into the cooking cycle. After cooking the solution was reweighed and any water which evaporated was replaced. The final pH of the solution was 7.1.

The performance of the above solutions was tested as retention aids as before. Starch and PAM were added to the furnish at a dose rate of 15 lb/ton (7.5 kg/tonne) and 0.25 lb/ton (0.125 kg/tonne) respectively. PAS prepared as in Example 1 was added to the furnish at 2 lb/ton (1 kg/tonne). Papermaker's alum and sodium aluminate were also added to the furnish in some tests. The order of addition was:

| Time (sec) | Step |
| --- | --- |
| 00 | Start mixer |
| 15 | Add aluminum compound |
| 30 | Add starch; add PAM |
| 45 | Add PAS |
| 60 | Open Britt Jar drain valve |
| 65 | Begin collecting white water |
| 95 | Stop collecting white water |

TABLE 5

% Ash Retention vs. Aluminum Addition Step

| Aluminum Type | Aluminum Dose lb/ton | Aluminum Dose kg/tonne | Ash Retention |
| --- | --- | --- | --- |
| None | 0 | 0 | 61% |
| Alum | 0.5 | 0.25 | 64% |
| Alum | 1.0 | 0.5 | 68% |
| Alum | 2.0 | 1.0 | 72% |
| Sodium Aluminate | 0.5 | 0.25 | 72% |
| Sodium Aluminate | 1.0 | 0.5 | 72% |
| Sodium Aluminate | 2.0 | 1.0 | 73% |

The results show that retention is further improved by adding an aluminum compound to the paper furnish.

EXAMPLE 6

This example demonstrates how using an alkaline aluminum compound to adjust the cationic PAM to pH above 7 before cooking boosts the blend's performance as a retention aid. Dry blends were prepared by mixing 3.0 grams of Stalok 300 cationic corn starch with 0.04 grams of PAM "B" and various amounts of sodium aluminate as listed for Samples D through G in Table 7. To these blends was added 497 grams of deionized water. The pH in the blend containing no sodium aluminate was adjusted to 8.5. The pH in the blends containing sodium aluminate was measured but not adjusted and is labeled as "a:pH". The solution was heated on a hot plate stirrer for 30 minutes and began to boil about 15 minutes into the cooking cycle. After cooking, the solution was reweighed and any water which had evaporated was replaced. The pH of the solution was again measured and is labeled as "b:pH".

The performance of the above solutions was tested as retention aids as before. Starch and PAM were separately added to the furnish at a dose rate of 15 lb/ton (7.5 kg/tonne) and 0.25 lb/ton (0.125 kg/tonne) respectively. PAS prepared as in Example 1 was added to the furnish in some tests. The order of chemical addition was the same as in Example 1.

TABLE 6

% Ash Retention vs. Cooking Procedure and PAS Dose

|  | Sample D | Sample E | Sample F | Sample G |
|---|---|---|---|---|
| A. Method of Preparing Samples | | | | |
| gm Sodium Aluminate Added: | 0 | 0.09 | 0.17 | 0.35 |
| a: pH | | 8.5 | 9.1 | 9.6 | 10.1 |
| b: pH | | 8.9 | 9.3 | 9.5 | 9.8 |
| B. Retention Test Results | | | | |
| PAS Dose (Kg SiO$_2$/Tonne) | | | | |
| 0 | | 27% | 34% | 34% | 35% |
| 0.5 | | 48% | 56% | 60% | 64% |

The results clearly show the benefit to using an alkaline aluminum compound to adjust the pH of the cationic starch/cationic PAM blends.

EXAMPLE 7

This example demonstrates how cooking cationic starch and nonionic PAM together at pH 10 yields better retention than adding the same two chemicals separately but simultaneously to the paper furnish. A dry blend was prepared by mixing 3.0 grams of Stalok 300 cationic corn starch from Staley Starch with 0.04 grams of nonionic PAM "D", having a molecular weight of about 14,000,000. To this blend was added 497 grams of deionized water. The pH was adjusted to 10.1. The solution was heated on a hot plate stirrer for 30 minutes and began to boil about 15 minutes into the cooking cycle. After cooking the solution was reweighed and any water which evaporated was replaced. The final pH of the solution was 9.9.

As a comparison, a sample of Stalok 300 was prepared as a 0.5 wt. % solution following the procedure above. The solution pH was found to be 7.5 and was not adjusted.

A 0.125 wt. % solution of PAM "D" was prepared by adding 1 gram of PAM "D" to 799 grams of deionized water and mixing the resulting solution for 1 hour. The solution pH was found to be 4.4 and was not adjusted.

The performance of the above solutions was tested as retention aids as before. Starch and PAM were added to the furnish at a dose rate of 15 lb/ton (7.5 kg/tonne) and 0.25 lb/ton (0.125 kg/tonne) respectively. PAS prepared as in Example 1 was added to the furnish in some tests. The order of addition was the same as in Example 1.

TABLE 7

% Ash Retention vs. Cooking Procedure and PAS Dose

| PAS Dose (Kg SiO$_2$/Tonne) | Separate Add'n Corn Starch + Nonionic PAM | Cooked both Corn Starch + Nonionic PAM |
|---|---|---|
| 0 | 11% | 22% |
| 0.5 | 19% | 33% |
| 1.0 | 22% | 33% |

The results clearly show retention is improved by cooking cationic starch and nonionic PAM together at pH 10 before adding these chemicals to the paper furnish.

EXAMPLE 8

This example demonstrates that advantages of the invention may be obtained at cooking temperatures below the preferred range of 80° C. to 100° C. Four different mixtures were prepared using 3.0 grams of BMB-40 cationic potato starch mixed with 472 grams of deionized water containing 2 ml of 0.1N sodium hydroxide solution and 25 grams of prehydrated cationic PAM "C". The solutions were heated to various temperatures with mixing during a 30 minute cooking cycle. A fourth solution was prepared by cooking 3 grams of BMB-40 starch in 497 grams of deionized water for 30 minutes at a temperature control set point of 95° C.

The four solutions were tested as papermaking retention aids. 0.5 lb/t (0.25 kg/tonne) of Al$_2$O$_3$ as alum, 20 lb/t (10 kg/tonne) of starch and 0.25 lb/t (0.125 kg/tonne) of PAM were added to the furnish. 4 nm colloidal silica was also added to the furnish following the procedure in Example 5. The table below shows the ash retention results.

TABLE 8

% Ash Retention vs. Cooking Temperature

| Colloidal Silica Dose (Kg SiO2/Tonne) | Separate Add'n Potato Starch + PAM | 65° C. Temp Set Pt. | 75° C. Temp Set Pt. | 85° C. Temp Set Pt. | 95° C. Temp Set Pt. |
|---|---|---|---|---|---|
| 1 | 27 | 69 | 51 | 48 | 44 |
| 2 | 54 | 79 | 74 | 68 | 66 |

The results show that ash retention is clearly superior when cooking cationic starch and cationic PAM together at temperatures below a preferred 95° C. cooking temperature for potato starch, as compared to adding the same chemicals prepared in their normal manner separately to the furnish.

What is claimed is:

1. A paper furnish containing, as a retention aid, a modified starch prepared by cooking at least one amphoteric starch, or cationic starch having a degree of substitution between about 0.01 to 0.2, with at least one polyacrylamide having a molecular weight of at least 500,000 selected from the group consisting of a nonionic polyacrylamide, an amphoteric polyacrylamide, and a cationic polyacrylamide having a degree of substitution between 1% and 80% by weight, said cooking being in an aqueous solution having a pH above about 7.0, wherein the weight ratio of starch to polyacrylamide is greater than about 5 to 1, for a time effective to gelatinize the starch and for the polyacrylamide to at least partially hydrate and react with the starch.

2. The paper furnish of claim 1 wherein said modified starch was prepared by cooking a cationic starch with a cationic acrylamide.

3. The paper furnish of claim 1 or 2 wherein said modified starch was prepared with a weight ratio of cationic starch to cationic acrylamide greater than 10 to 1.

4. The paper furnish of claim 1 or 2 wherein said modified starch was prepared from corn starch, potato starch, or waxy maize starch.

5. The paper furnish of claim 1 or 2 wherein an alkaline aluminum compound was present during cooking of the modified starch.

6. The paper furnish of claim 3 wherein said modified starch was prepared from corn starch, potato starch, or wavy maize starch.

* * * * *